United States Patent
Tokisue et al.

(10) Patent No.: US 6,249,403 B1
(45) Date of Patent: *Jun. 19, 2001

(54) MAGNETIC HARD DISK DRIVE AND PROCESS FOR PRODUCING THE SAME

(75) Inventors: Hiromitsu Tokisue, Ibaraki-ken; Sunao Yonekawa, Odawara; Nobuyuki Ishii, Odawara; Yasuyuki Horiguchi, Odawara; Yoshishige Endo, Tsuchiura; Yasuhiro Yoshimura, Ibaraki-ken; Yutaka Ito, Takahagi; Osamu Narisawa; Hiroshi Yuyama, both of Odawara; Youichi Inoue, Ryugasaki; Yukiko Ikeda, Ibaraki-ken, all of (JP)

(73) Assignee: Hitachi, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,417

(22) Filed: May 18, 1998

(30) Foreign Application Priority Data

May 30, 1997 (JP) .................................................. 9-141790
May 23, 1997 (JP) .................................................. 9-165671

(51) Int. Cl.[7] .............................. G11B 5/255; G11B 5/60
(52) U.S. Cl. ........................................................ 360/235.2
(58) Field of Search ........................... 360/97.01, 97.02, 360/103, 235.2, 235.8, 236.6

(56) References Cited

U.S. PATENT DOCUMENTS

| | | | |
|---|---|---|---|
| 3,818,064 | * 6/1974 | Kim | 556/431 |
| 5,118,577 | * 6/1992 | Brar et al. | 428/409 |
| 5,147,684 | * 9/1992 | Tamura et al. | 427/131 |
| 5,219,651 | * 6/1993 | Shoji et al. | 428/323 |
| 5,231,613 | * 7/1993 | Nakayama et al. | 369/13 |
| 5,266,409 | * 11/1993 | Schmidt et al. | 428/446 |
| 5,300,670 | * 4/1994 | Kobayashi | 556/454 |
| 5,386,400 | * 1/1995 | Nakayama et al. | 369/13 |
| 5,426,205 | * 6/1995 | Kirchmeyer et al. | 556/422 |
| 5,661,618 | * 8/1997 | Brown et al. | 360/97.02 |
| 5,768,056 | * 6/1998 | Boutaghou et al. | 360/103 |
| 5,980,992 | * 11/1999 | Kistner et al. | 427/384 |

FOREIGN PATENT DOCUMENTS

| | | | |
|---|---|---|---|
| 0 601 839 | * 6/1994 | (EP) | . |
| 53-144525 | * 12/1978 | (JP) | . |
| 56-169264 | * 12/1981 | (JP) | . |
| 60-0109074 | * 6/1985 | (JP) | . |
| 63-251981 | * 10/1988 | (JP) | . |
| 1-171101 | * 7/1989 | (JP) | . |
| 1-236412 | * 9/1989 | (JP) | . |
| 2-014857 | * 1/1990 | (JP) | . |
| 2-55781 | * 2/1990 | (JP) | . |
| 3-088189 | * 4/1991 | (JP) | . |
| 3-127326 | * 5/1991 | (JP) | . |
| 4-159637 | * 6/1992 | (JP) | . |
| 4-285727 | 10/1992 | (JP) | . |
| 4-336258 | * 11/1992 | (JP) | . |
| 6-259911 | 9/1994 | (JP) | . |
| 8-147655 | 6/1996 | (JP) | . |
| 8-194930 | 7/1996 | (JP) | . |
| 94/08334 | * 4/1994 | (WO) | . |

* cited by examiner

Primary Examiner—William Klimowicz
(74) Attorney, Agent, or Firm—Kenyon & Kenyon

(57) ABSTRACT

A magnetic hard disk drive comprising a magnetic disk and a magnetic head slider, characterized in that said magnetic head slider is coated with a layer having a contact angle of 50° or more when measured by using a lubricant coated on the magnetic disk, is free from start failure due to stiction caused by adhesion of the lubricant to the slider surface.

2 Claims, 12 Drawing Sheets

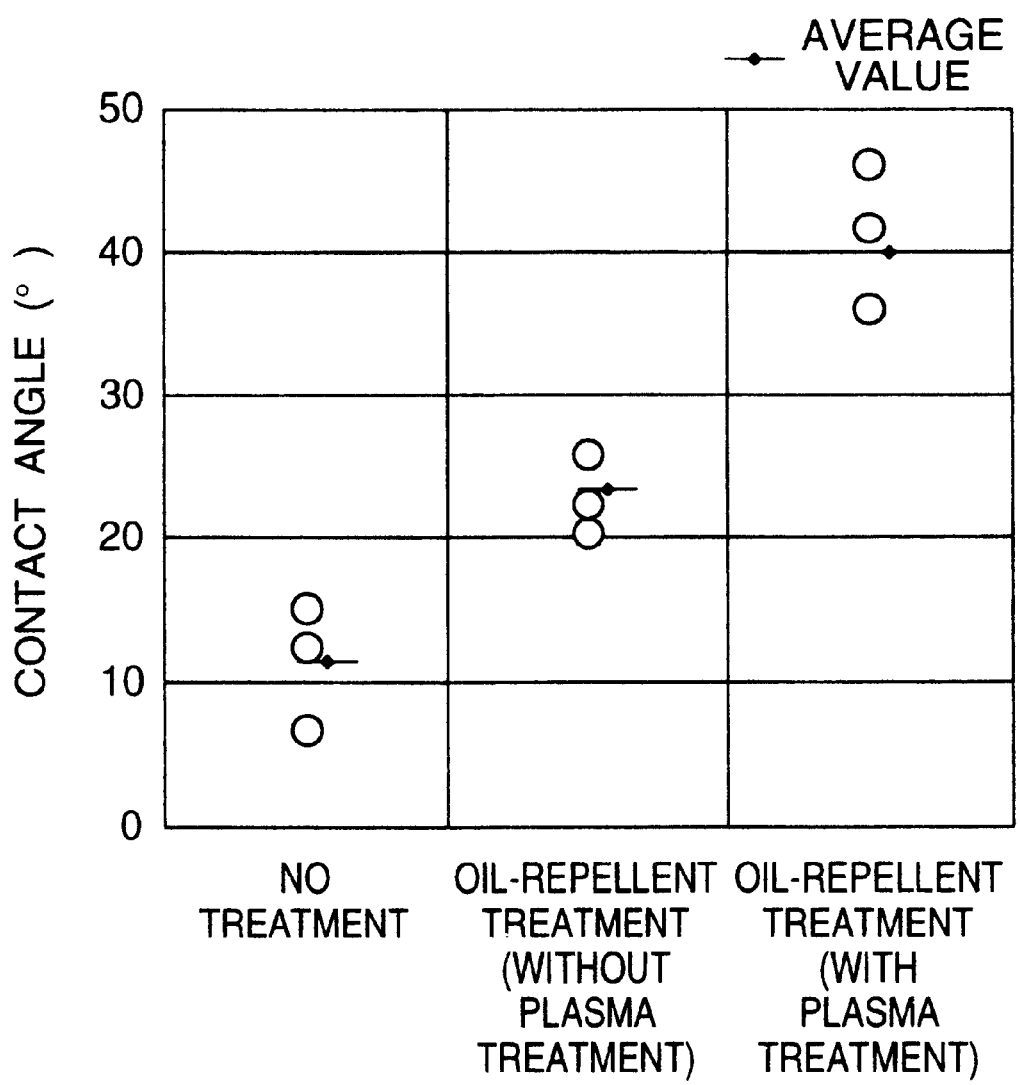

MAGNETIC HARD DISK DRIVE AND PROCESS FOR PRODUCING THE SAME

BACKGROUND OF THE INVENTION

This invention relates to a magnetic hard disk drive and a process for producing the same, more particularly, to a magnetic hard disk drive having loaded therein a magnetic disk and a magnetic head slider for preventing the start failure due to stiction between the magnetic head slider and the magnetic disk.

As a method for preventing the start failure of a magnetic hard disk drive due to the stiction, it is known to be effective to allow the magnetic disk-facing surface of the slider to have a low surface energy, thereby inhibiting the adhesion and buildup of a lubricant or grease onto the slider. That is to say, there is such a phenomenon that during the long term operation of the drive, the lubricant applied to the magnetic disk and the grease applied to a spindle bearing or a carriage bearing adhere to and build up on the slider and, after the stopping of the drive, they spread into the contact space between the slider and the magnetic disk to fill up the space, and consequently, a great adsorption force acts on between the slider and the magnetic disk by the meniscus force in the space, whereby the slider and the magnetic disk adhere to each other. It is the technique which intends to prevent, in this case, the buildup of the lubricant and grease on the slider by allowing the magnetic disk-facing surface of the slider to have a low surface energy, and consequently prevent the start failure.

As a prior technique for allowing the magnetic disk-facing surface of the slider to have a low surface energy, JP-A 63-64,684 discloses that a layer having a lower surface energy than that of the constituting material of the slider body, for example, a polytetrafluoroethylene (PTFE) layer is provided on the surface portion not contacting the magnetic disk on the magnetic disk-facing surface of the slider to which a magnetic head is attached.

However, according to the prior technique disclosed in JP-A 63-64,684, the magnetic disk-facing surface of the slider is composed of a PTFE layer having a low surface energy, and since the surface energy of PTFE is 15 mN/m, it has an effect of repelling the grease to prevent the grease from adhering to the slider. However, the surface is insufficient in ability to repel a lubricant for magnetic disk which lubricant has a surface energy as low as about 20 mN/m, and hence, there has been such a problem that it is difficult to prevent the lubricant from adhering to the slider and consequently prevent the start failure of the magnetic hard disk drive due to the stiction resulting from the lubricant.

From the above surface energy values of the PTFE and lubricant, it has been inferred that the contact angle of the lubricant on the magnetic disk-facing surface of the slider provided with the PTFE layer is about 40° and, at such a low contact angle, the sufficient prevention of the lubricant from adhering to the slider is difficult.

On the other hand, in JP-A 54-58,736, a method is proposed which comprises treating the surface of a slider with an alkali and thereafter adhering thereto a material having a fluorinated alkyl group and a terminal halogen, cyano or alkoxyl group to form a low surface energy layer.

When the surface to be treated is treated with an alkali, it has an effect of enhancing the adherability of the above-mentioned material having a fluorinated alkyl group and a terminal halogen, cyano or alkoxyl group, but has such a disadvantage that the magnetic layer of the magnetic head existing at the back end of the slider is eroded. Moreover, when the surface of the slider is composed of a non-metal such as a carbonaceous material or the like, there has been such a problem that the above-mentioned terminal group hardly adheres and the stability thereof becomes very low.

SUMMARY OF THE INVENTION

An object of this invention is to overcome the disadvantages of the prior art and to provide a magnetic hard disk drive in which a lubricant applied to a magnetic disk is prevented from adhering to the magnetic disk-facing surface of a slider and the start failure due to stiction resulting from adhesion of the lubricant is prevented and also a process for producing the above-mentioned magnetic hard disk drive.

This invention provides a magnetic hard disk drive comprising a magnetic disk for recording signals and a magnetic head slider facing the magnetic disk and including a magnetic head element for recording and reproducing information by scanning on the revolving magnetic disk, said slider being coated with a layer having a contact angle of 50° or more when measured by using a lubricant coated on the magnetic disk.

This invention also provides a magnetic hard disk drive comprising a magnetic disk for recording signals and a magnetic head slider facing the magnetic disk and including a magnetic head element for recording and reproducing information by scanning on the revolving magnetic disk, said slider being coated with a layer of at least one member selected from the group consisting of hydrocarbon compounds, fluorinated carbon compounds and fluorine-containing silane compounds (or fluorosilane compounds).

This invention further provides a magnetic hard disk drive comprising a magnetic disk for recording signals and a magnetic head slider facing the magnetic disk and including a magnetic head element for recording and reproducing information by scanning on the revolving magnetic disk, said slider having a protective layer and a fluorosilane compound layer thereon on the surface facing the magnetic disk, said fluorosilane compound layer being formed after activation treatment of the protective layer surface.

In this case, the same effect is obtained even when ultraviolet light irradiation is conducted before or after or both before and after the formation of the fluorosilane compound layer.

This invention still further provides a process for producing the above-mentioned magnetic hard disk drives.

BRIEF DESCRIPTION OF THE DRAWINGS

FIG. 13 is a view showing the result of a test of the lubricant contact angle of the magnetic head slider in the Example shown in FIG. 10 in comparison with a conventional example.

DESCRIPTION OF THE PREFERRED EMBODIMENTS

The present inventors have found that in order to prevent a certain liquid material from adhering to a magnetic head slider, it is necessary to allow the magnetic disk-facing surface of the slider to have so low a surface energy that when the magnetic disk-facing surface of the slider is subjected to measurement of contact angle using the above liquid material, the contact angle becomes 50° or more, and have reached this invention.

The magnetic hard disk drive of this invention comprises a magnetic disk for recording signals and a magnetic head slider facing the magnetic disk and including a magnetic head element for recording and reproducing information by scanning on the revolving magnetic disk, said slider being coated with a layer having a contact angle of 50° or more when measured by using a lubricant coated on the magnetic disk.

Figure 1:
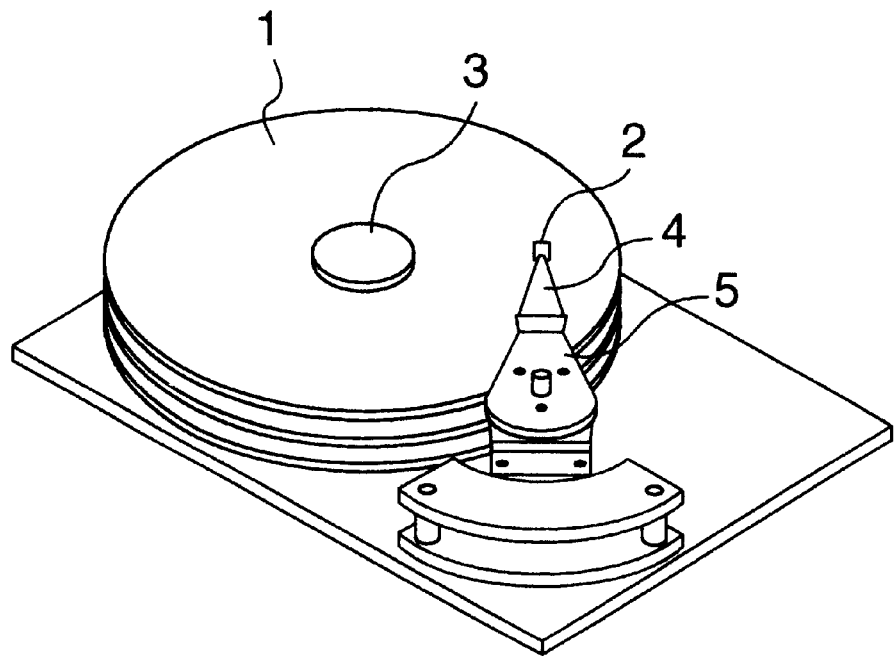
FIG. 1 is a perspective view of the magnetic hard disk drive of this invention.

The above magnetic hard disk drive has such a structure as shown in FIG. 1. In FIG. 1, a magnetic disk 1 for recording signals is fixed to a spindle 3 and revolved in this state, and above the surface of this revolving magnetic disk 1, a magnetic head slider 2 provided with a magnetic head element for recording and reproducing information is moved approximately in the radial direction of the magnetic disk 1 through a suspension 4 by means of a carriage 5.

Figure 2:
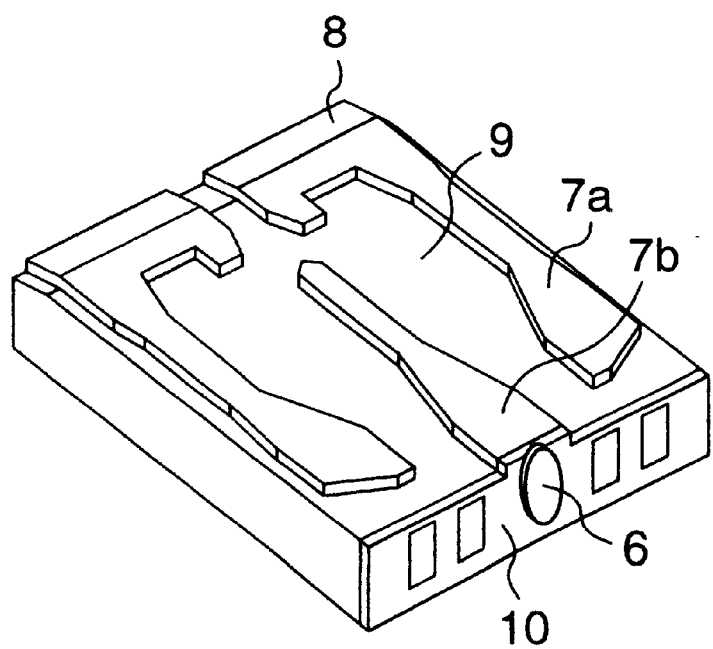
FIG. 2 is a perspective view showing the magnetic disk-facing surface of a magnetic head slider.

FIG. 2 is a perspective view showing the magnetic disk 1-facing surface of a magnetic head slider 2, comprising a flying rail 7a composed of a crossrail having a taper 8 at an entrance end and a side rail for generating a flying force; and a center rail 7b having attached thereto a magnetic head element 6. The bleed surface 9 depressed several micrometers from the plane of these rails is required to satisfy that when the contact angle of a lubricant coated on the magnetic disk is indicated as θ, the θ value obtained when the said lubricant is dropped on the bleed surface 9 is 50° or more. In FIG. 2, 6 refers to a magnetic head element and 10 to the back end face.

Figure 3:
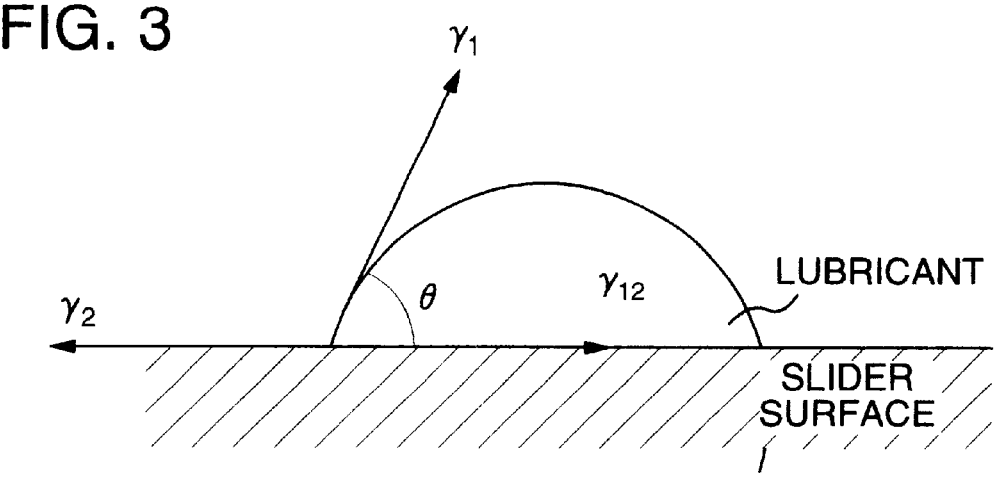
FIG. 3 is a sectional view explaining a contact angle.

The contact angle θ of the lubricant 11 on the slider surface (bleed surface) 9 is measured in such a manner as shown in FIG. 3.

Moreover, the relation between the surface energy of the lubricant and the contact angle θ is represented by the following equation:

$$\gamma_2 = \gamma_1 \times \cos\theta + \gamma_{12} \tag{1}$$

wherein $\gamma_1$ is the surface energy of the lubricant, $\gamma_2$ is the surface energy of the slider surface, and $\gamma_{12}$ is the interface energy between the slider surface and the lubricant.

In this invention, it is necessary that the slider face of the magnetic head slider satisfy the conditions that the contact angle θ determined using the above lubricant or grease is 50° or more (preferably 110° or less, more preferably 106° or less).

Figure 6:
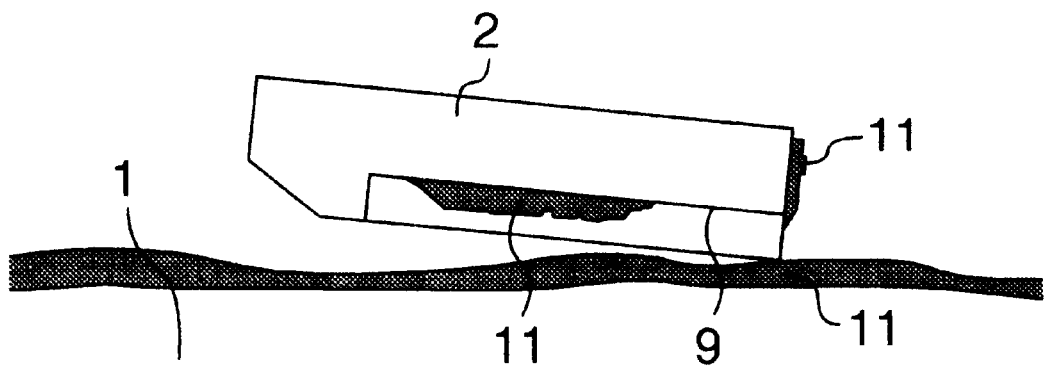
FIG. 6 is a side sectional view of a magnetic head slider and a magnetic disk which are under operation.

The above conditions are determined as follows:

FIG. 6 shows the side sectional view of the magnetic head slider 2 and the magnetic disk 1 which are under operation. The slider 2 is flown above the surface of the magnetic disk 1 through an air layer in substantially no contact. Alternatively, as shown in the Figure, the slider 2 travels while the center rail 7b thereof is in contact with the magnetic disk 1. In order to prevent the slider 2 and the magnetic disk 1 from being abraded and damaged when the two are contacted with each other, a lubricant 11 such as a perfluoropolyether is coated on the surface of the magnetic disk 1.

As shown in FIG. 6, when the slider 2 is flown above or traveled in contact with the surface of the magnetic disk 1, the lubricant 11 adheres to and builds up on the bleed surface 9 of the slider 2. In order to quantify the relation between the built-up adhered amount and the surface energy of the slider 2, grease is used as the adhering liquid to determine the built-up adhered amount of grease to the slider 2 after the continuous operation for 1,000 hours and the contact angle of grease on the surface of the slider 2.

The built-up adhered amount of grease is indicated by the value (mm$^2$) obtained by allowing the slider to stand on the magnetic disk, then peeling off the slider, and measuring the adhering area on the circular plate surface of the grease transferred to the circular plate remaining thereafter.

Figure 7:
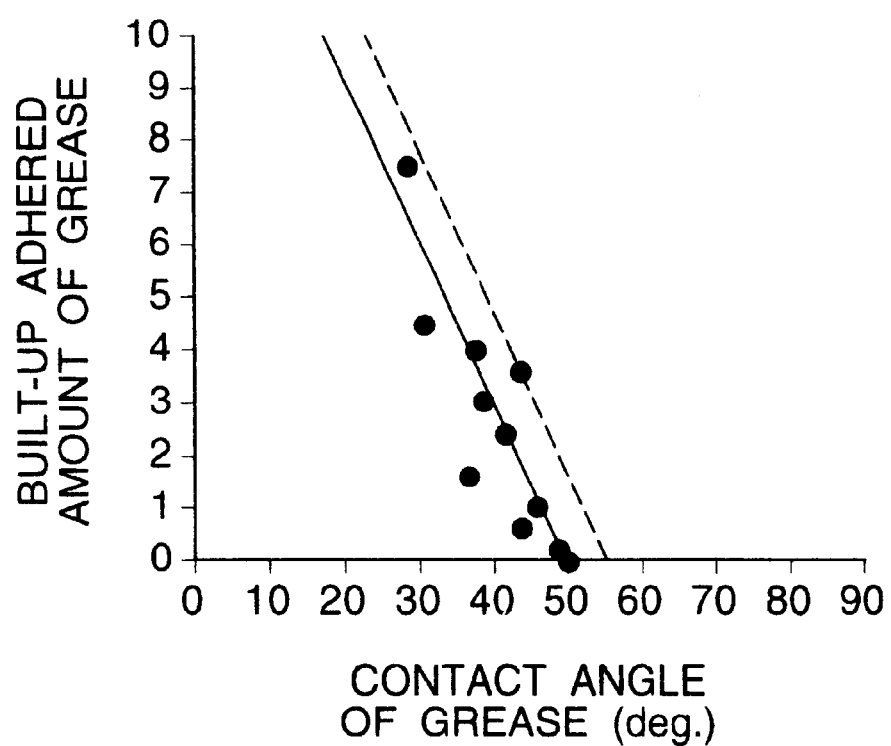
FIG. 7 is a graph showing a relation between the built-up adhered amount of grease to a magnetic head slider and the contact angle of the grease on the surface of the slider.
Figure 8:
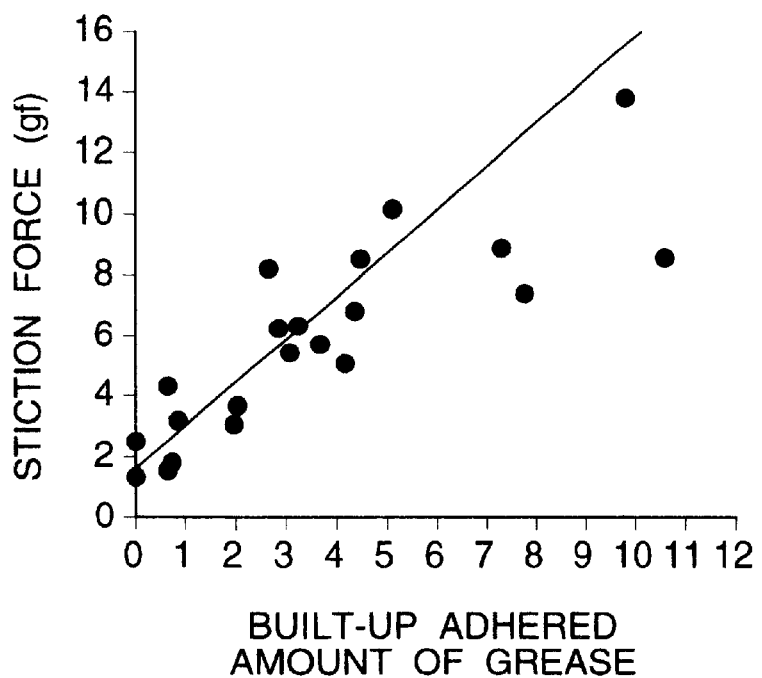
FIG. 8 is a graph showing a relation between the stiction force acting on between a magnetic head slider and a magnetic disk and the built-up adhered amount of grease to the slider.

The relation between the built-up adhered amount and the contact angle is shown in FIG. 7 and the relation between the stiction force generated at that time and the built-up adhered amount is shown in FIG. 8. As shown by solid line in FIG. 7, it is understood that when the contact angle of grease on the surface of the slider 2 is 50° or more, the grease does not adhere to the slider 2. In addition, at this time, namely when the built-up adhered amount of grease to the slider 2 is zero, it is understood from FIG. 8 that the stiction force stands still at a value as small as about 2 gf which is the same as in the initial state.

Here, the built-up adhered amount is inferred to be zero at a contact angle of 50° or more based on the solid line in FIG. 7. However, the data shown in FIG. 7 include variation of measurement. In order to adjust the built-up adhered amount of grease to zero even under the worst conditions of variation, the contact angle of grease on the surface of the slider 2 is desirably 55° or more as shown by the broken line in the Figure and, at said contact angle, the built-up adhered amount is more surely made zero, and hence, said contact angle is preferable.

In the above, the contact angle θ is measured using grease. However, the present inventors have confirmed that even when the lubricant on the magnetic disk surface is used, the same result is obtained.

As stated above, in order to allow the magnetic disk-facing surface of the magnetic head slider to satisfy that the contact angle θ is 50° or more as measured using grease or the lubricant on the magnetic disk, it is considered necessary to subject the slider surface to a treatment such as coating with a special material or the like.

Here, as the special material, there is preferably used at least one compound selected from the group consisting of hydrocarbon compounds, fluorinated carbon compounds and fluorine-containing silane compounds (or fluorosilane compounds).

As the hydrocarbon compounds, there are preferably used, for example, fatty acids such as stearic acid and the like.

As the fluorinated carbon compounds, there are preferably used fluoroalkyl salts (e.g., FC 93), fluoroalkyl azides, fluoroalkyl isocyanates (e.g., $C_8F_{17}NCO$), fluoroether alkyl azides (e.g., Fomblin azide, $N_3COO$-R-Fomblin-$OCON_3$), fluorocarbon, fluoroether, fluorinated graphite and the like.

As the fluorine-containing silane compounds or fluorosilane compounds, there are preferably used fluoroalkylsilane monomers represented by the formula (2):

$$F_3C-(CF_2)_n-(CH_2)_m-SiX_3 \quad (2)$$

wherein x represents an alkoxy group having 1 to 6 carbon atoms, a halogen or a cyano group; n represents an integer of 0 to 13; and m represents an integer of 0 to 10; oligomers obtained from the above fluoroalkylsilane monomers; and fluoroalkylsilane derivatives.

As others, there can be used aminosilanes (e.g., $NH_2CH_2CH_2CH_2-Si(OCH_3)_3$), fluoroplastics (e.g., Cylop, mfd. by Asahi Glass Co., Ltd.,

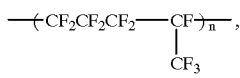

$$-(CF_2CF_2CF_2-CF)_n-,$$
$$\phantom{-(CF_2CF_2CF_2-}|$$
$$\phantom{-(CF_2CF_2CF_2-}CF_3$$

M.W.=2,000) and the like.

The oligomer of fluoroalkylsilane can be produced from fluoroalkylsilane monomer by the following methods:

A first method is a method which comprises adding an acid (e.g., hydrochloric acid) to a fluoroalkylsilane monomer, stirring them, thereafter adding to the mixed solution a solvent which dissolves the resulting oligomer of the fluoroalkylsilane (e.g., a fluorine-containing solvent) and subjecting the oligomer of the fluoroalkylsilane together with the above solvent to solvent extraction.

This method has such an effect that the liquid can be prevented from being gelated by the rapid bonding of the fluoroalkylsilane caused upon adding water or an alkali for diluting or neutralizing the acid added.

A second method is a method which comprises adding an acid (e.g., hydrochloric acid) to a fluoroalkylsilane monomer, stirring them, thereafter adding deionized water to the resulting mixed solution, removing the separated water phase, and repeating one or more times the steps of addition of deionized water and removal of water phase to substantially remove the acid in the mixed solution and thereafter extracting the resulting oligomer of the fluoroalkylsilane as an organic phase.

Alternatively, there is a method which comprises adding an acid (e.g., hydrochloric acid) to a fluoroalkylsilane monomer, stirring them, thereafter adding an alkali (e.g., sodium hydroxide) to the resulting mixed solution to make the mixed solution substantially neutral, further adding deionized water to the mixed solution, removing the separated water phase, adding deionized water again to the residue, repeating the above steps and thereafter extracting the resulting oligomer of the fluoroalkylsilane as an organic phase.

This method has such an effect that the oligomer of the fluoroalkylsilane can be extracted in the state that the purity is approximately 100%.

As the magnetic disk in the magnetic hard disk drive of this invention, there can be used those which can be usually used in the art. The magnetic disk is composed of, for example, a NiP-plated disk substrate, a Cr intermediate layer formed thereon, a magnetic layer provided thereon and a sliding protective layer provided thereon (e.g., carbon protective layer).

Even if the contact angle θ is slightly smaller than 50°, the same effect as obtained by adjusting the contact angle θ of such a lubricant to 50° or more can be obtained by combining it with an activation treatment prior to or after the formation of the coating layer such as a fluorine-containing silane compound layer on the slider surface.

That is to say, when the magnetic disk-facing surface of the magnetic head slider is coated with a layer of a non-metal such as a carbonaceous material or the like, it has heretofore been difficult to stably attach the terminal group of a material having a fluorinated alkyl group and a terminal halogen, cyano or alkoxyl group, for example, a fluorine-containing silane compound to the slider surface.

In this invention, it has been, for the first time, found that even in such a case, a fluorine-containing silane compound is stably attached by conducting an activation treatment such as a special plasma surface treatment or the like.

That is to say, many hydroxyl groups can be introduced into the slider surface layer, which is the surface to be treated, by exteriorly introducing activated oxygen into the area contacting with the slider surface to make the slider surface rich in oxygen. On the other hand, a silane type oil repellent, for example, a fluoroalkylalkoxysilane which is a kind of fluorine-containing silane compound, has a fluorine-containing alkyl group and also has silane at its end. This reacts with the excessive water content, whereby the terminal group is converted to a silanol group represented by Si—OH. This silanol group reacts with the hydroxyl group on the above-mentioned slider surface, whereby dehydration condensation reaction proceeds as shown in the formula (3):

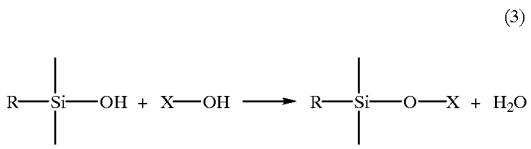

$$R-\overset{|}{\underset{|}{Si}}-OH + X-OH \longrightarrow R-\overset{|}{\underset{|}{Si}}-O-X + H_2O \quad (3)$$

Incidentally, X is an element constituting the slider surface layer and is usually carbon, and R is a fluorine-containing alkyl group. As a result, the slider matrix material element and the fluorine-containing silane type oil repellent are bonded to each other, whereby a dense layer having a very high bonding site density (a lower surface energy layer) can be formed.

As a plasma surface treatment method for activating such a surface, there are, for example, the following methods:

In a treating vessel is placed under atmospheric pressure a mixed gas in which a side reaction gas of methanol or ethanol is mixed with a He atmosphere gas and, as an electric source, there is used such that a plasma can be generated at a high frequency electric source of 10 MHz or more. The above-mentioned high frequency is applied to the above-mentioned mixed gas atmosphere to produce a plasma and a magnetic head slider is placed therein to be subjected to surface treatment, whereby a part of the methanol or ethanol is decomposed to make it possible to introduce many hydroxyl groups onto the surface.

Alternatively, the surface activation can be achieved also by an ion implantation method. The implantation conditions are preferably such that, for example, an oxygen gas is accelerated at an accelerating voltage of 10 KV to treat the surface and the amount of ions implanted is $2 \times 10^{16}$ ions/cm² or more and the oxygen/carbon concentration ratio (O/C) in which the carbon concentration is the content of carbon in the above-mentioned carbon layer ranges from 3 to 20%.

The same effect is also obtained by conducting, in place of the above-mentioned activation method, ultraviolet light irradiation before or after or both before and after the formation of the layer of a fluorine-containing silane compound.

Incidentally, it is known that the same effect is obtained even when the ultraviolet light irradiation treatment is effected after the formation of the carbon layer. In this case, it is preferable that the ultraviolet light irradiation is conducted at an intensity of 100 to 30 mW/cm² in an ozone atmosphere.

Moreover, since adhered contaminants such as organic materials or the like can be decomposed by the ultraviolet light irradiation, a surface-cleaning effect can be expected.

Furthermore, when the carbon thin layer on the slider surface is subjected to plasma treatment, the effect is further enhanced by adjusting the center line average height Ra of the magnetic disk surface facing the slider surface to 10 nm or less.

This invention is more specifically explained below based on Examples.

EXAMPLE 1

A magnetic hard disk drive as shown in FIG. 1 was prepared. In FIG. 1, 1 refers to a magnetic disk for recording signals and this is revolved in the state that it is fixed to a spindle 3. Above the surface of the revolving magnetic disk 1, a slider 2 equipped with a magnetic head element for recording and reproducing information is moved substantially in the radial direction of the magnetic disk 1 by a carriage 5 through a suspension 4.

Figure 4:
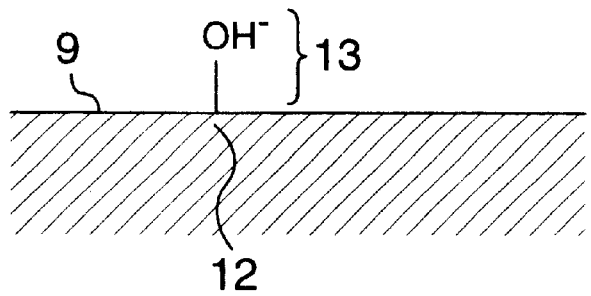
FIG. 4 is a sectional view showing the surface state of the magnetic disk-facing surface (bleed surface) of a magnetic head slider before a fluoroalkylsilane is allowed to adhere thereto.
Figure 5:
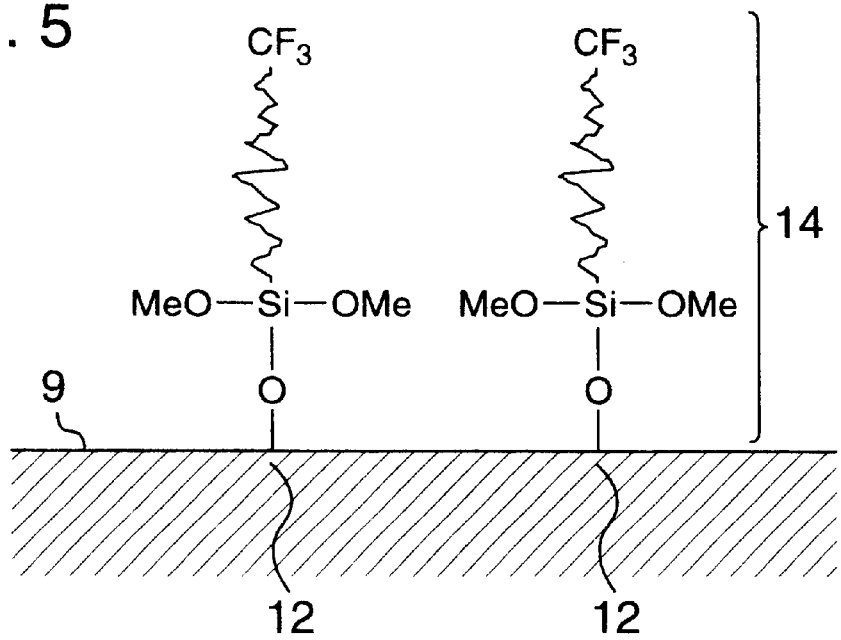
FIG. 5 is a sectional view showing the surface state of the bleed surface of a magnetic head slider after a fluoroalkylsilane has been allowed to adhere thereto.

FIG. 2 is a perspective view showing the magnetic disk 1-facing surface of a slider 2, which comprises a flying rail 7a composed of a crossrail having a taper 8 at an entrance end and a side rail for generating a flying force; and a center rail 7b having attached thereto a magnetic head element 6. On the surface of the slider (or bleed) surface 9 depressed several micrometers from the plane of these rails, a layer of a fluoroalkylsilane which is a fluorine-containing silane compound is formed. In addition, the surface of the back end face 10 of the slider 2 is, if necessary, composed of a fluoroalkylsilane. The fluoroalkylsilane has the structure of $CF_3(CF_2)_n(CH_2)_m$—$SiX_3$ in which n is an integer of 0 to 13, m is an integer of 0 to 10 and X represents an alkoxy group having 1 to 6 carbon atoms (particularly methoxy group), a halogen or a cyano group. In this case, $X_3$ may be a combination of different kinds of the above-mentioned groups. FIG. 4 and FIG. 5 are surface structure views showing the surfaces of the bleed surface 9 of the slider 2 before and after the fluoroalkylsilane layer is formed. On the bleed surface 9 before the fluoroalkylsilane layer is attached thereto lie scattered hydroxyl groups 13 which become the bonding sites 12 of the fluoroalkylsilane, and the hydroxyl groups 13 and the methoxy groups of the fluoroalkylsilane are adsorption-bonded to form a fluoroalkylsilane monomer layer 14 on the bleed surface 9.

FIG. 6 is a side sectional view of a magnetic head slider 2 and a magnetic disk 1 which are under operation, the slider 2 is flown in substantially no contact above the magnetic disk 1 through an air layer or is traveled while the center rail 7b of the slider 2 is contacted with the magnetic disk 1 as shown in the Figure. In order to prevent the slider 2 and the magnetic disk 2 from being abraded and damaged when the two are contacted with each other, a lubricant 11 such as a perfluoropolyether is coated on the surface of the magnetic disk 1.

As shown in FIG. 6, when the slider 2 is flown above or traveled in contact with the surface of the magnetic disk 1, the lubricant 11 is adhered to and built up on the bleed surface 9 of the slider 2.

In order to prevent the lubricant from being adhered, according to the present Example, the bleed surface 9 is covered with a fluoroalkylsilane monomer layer 14. The outermost surface of the fluoroalkylsilane monomer layer 14 is composed of $CF_3$ groups having a surface energy of 6 mN/m, whereby the contact angle of the lubricant 11 having a surface energy of about 20 mN/m on the bleed surface 9 covered with the fluoroalkylsilane monomer layer 14 becomes 55 to 70° or so according to the above-mentioned equation (1), so that the lubricant 11 does not adhere to nor build up on the slider 2, and hence, the generation of a great stiction force which disturbs the start of the drive can be prevented.

EXAMPLE 2

Figure 9:
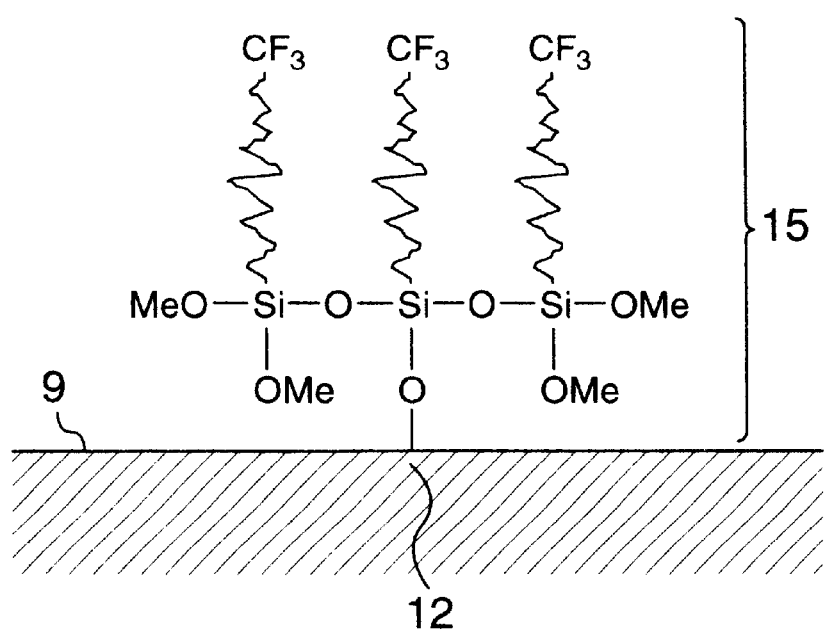
FIG. 9 is a sectional view showing the surface state of the bleed surface of the magnetic head slider in Example 2.

Another Example of this invention is explained using FIG. 9. FIG. 9 is a surface structure view showing the surface portion of the bleed surface 9 of the magnetic head slider 2 of this invention, and a fluoroalkylsilane oligomer layer 15 is bonded at the bonding sites 12 on the bleed surface 9. By a treatment with the lubricant 11 at a lower temperature for a shorter time than in Example 1, such a result was obtained that the contact angle of the bleed surface 9 is 55 to 70°.

According to this Example, even when the number density of the bonding sites 12 on the bleed surface 9 is small, or even when the probability of bonding of a fluoroalkylsilane to the bonding sites 12 is small, it is possible to arrange on the bleed surface 9 many $CF_3$ group-containing fluoroalkylsilane molecules as compared with the fluoroalkylsilane monomer layer 14. Accordingly, on the slider surface before the treatment which surface has a small number density of bonding sites 12, and even on the slider surface before the treatment which surface has a small probability of bonding to the bonding sites 12, it is possible to prevent the lubricant 11 from being adhered to and built up on the slider 2 by forming a fluoroalkylsilane oligomer layer. Accordingly, a great stiction force which disturbs the start of the drive can be prevented from being generated.

As is clear from the above explanation, according to this invention, by allowing the magnetic head slider surface to have a contact angle of 50° or more as measured using a lubricant coated on the surface of the magnetic disk, the lubricant coated on the magnetic disk is prevented from adhering to and building up on the slider. Accordingly, the start failure of the magnetic hard disk drive due to stiction can be prevented and there can be provided a magnetic hard disk drive which is excellent in safety against the start failure and high in reliability.

EXAMPLE 3

Figure 10:
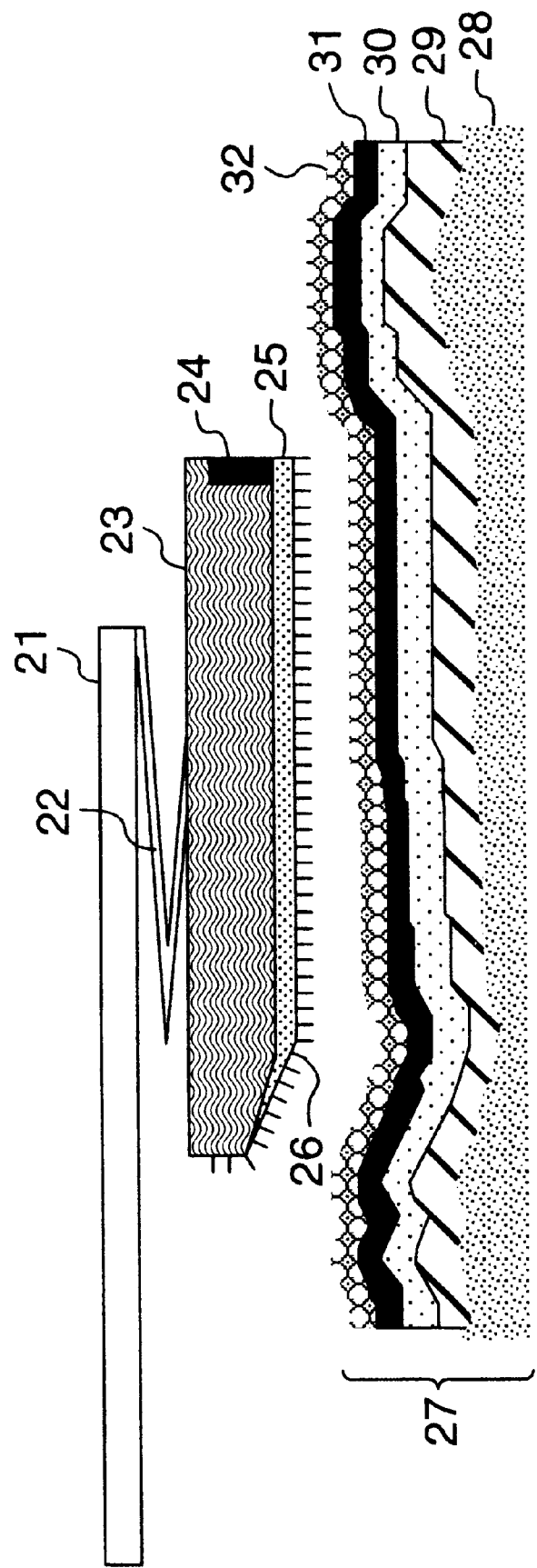
FIG. 10 is a side sectional view of the magnetic head slider in Example 3 relating to this invention.

FIG. 10 shows the magnetic head slider and the magnetic disk 27 in the magnetic hard disk drive used in this Example. FIG. 10 conceptionally shows the section obtained by cutting the magnetic head slider and the magnetic disk 27 by a plane which is in parallel to the direction of movement of the magnetic disk and vertical to the magnetic disk surface (recording surface). The magnetic disk 27 which is a recording medium is composed of a NiP-plated disk substrate 28, a Cr intermediate layer 29 formed thereon, a CoCr type magnetic layer 30 having a thickness of 30 nm formed on the Cr intermediate layer 29, and a carbon protective layer 31 having a thickness of 20 nm formed as a sliding-protecting layer on the magnetic layer 30. Moreover, for securing the sliding reliability thereof, a liquid lubricant 32 is coated in a thickness of about 2 nm on the carbon protective layer 31. On the other hand, at the front end of the suspension 21, a gimbals 22 is formed for flexibly supporting the suspension, and the slider 23 is joined therethrough to the suspension. The length of the slider 23 in the direction of movement of the magnetic disk is 2 mm, and a magnetic transducing element 24 for recording and reproducing data is loaded at the back end. The magnetic disk 27 is moved from the left to the right in the Figure. The above slider 23 is composed of the slider body of alumina titanium carbide ($Al_2O_3TiC$) and a carbon thin layer 25 formed thereon in a thickness of about 10 nm as the head protective layer, and an oil repellent layer 26 is formed on the surface of the carbon thin layer 25.

Figure 11:
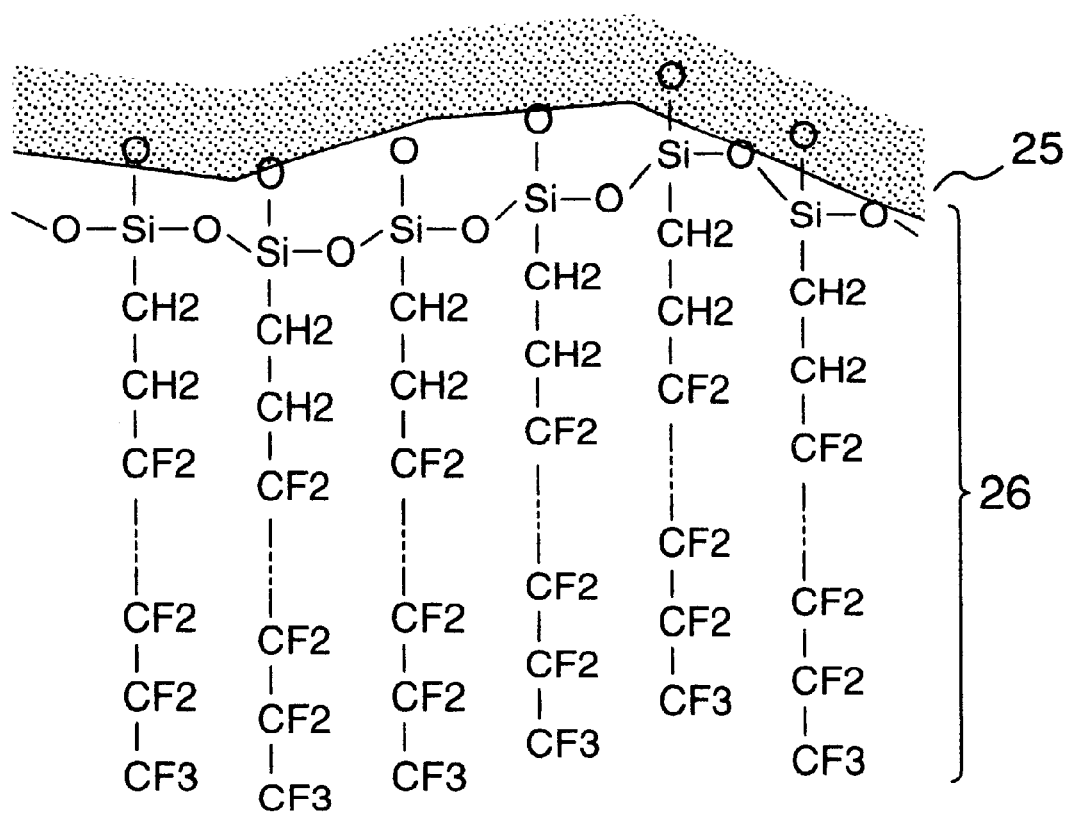
FIG. 11 is a schematic view of an oil repellent polymer layer on the magnetic head slider surface shown in FIG. 10.

FIG. 11 schematically shows the molecular structure of the slider surface subjected to oil repellent treatment, namely the molecular structure of the oil repellent layer 26. This molecular structure has terminal $CF_3$—$CF_2$ groups very low in surface tension on the outermost surface, namely the surface facing the magnetic disk, and on its opposite side, namely the slider side, is intimately bonded through silanol groups to the slider protective layer (carbon thin layer 25).

The characteristic feature of the oil repellent treatment in this invention is explained using FIGS. 12A to 12E. The silane type oil repellent, for example, a fluoroalkylalkoxysilane which is a kind of fluorine-containing compound, has a methoxy group represented by —$CH_3O$ at the end of its fluorine-containing alkyl group. When this fluoroalkylalkoxysilane is dissolved in a solvent, it reacts with a slight amount of water present in the solvent, and it follows that the end thereof has a hydroxyl group.

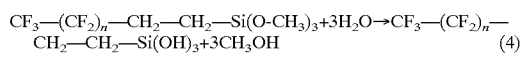

Figure 12A:
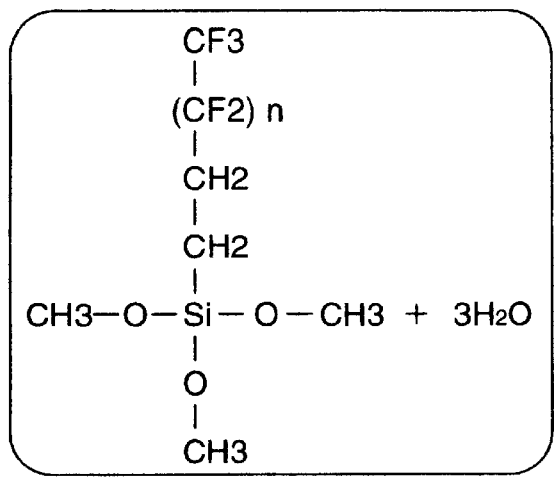
FIGS. 12A to 12E are explanatory views showing the process of the surface adhesion of a silane type oil repellent in the Example shown in FIG. 10.
Figure 12B:
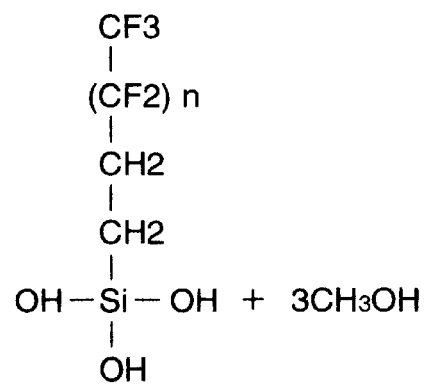

As shown in FIGS. 12A and 12B, dealcoholization proceeds to produce a silanol (Si—OH).

Figure 12C:
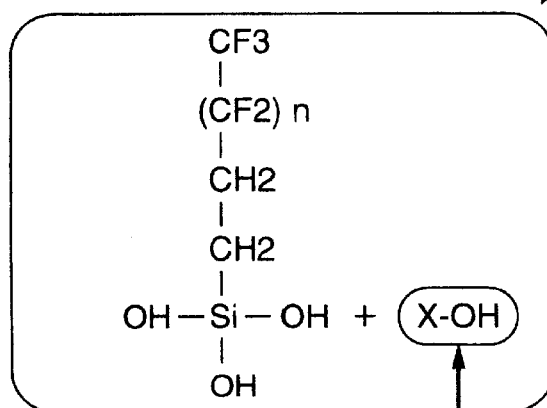

On the other hand, the magnetic head slider is subjected to the plasma surface treatment mentioned below. The treatment vessel is such that a plasma can be generated in the vessel under atmospheric pressure using a mixed gas formed by incorporating the side reaction gas of methanol or ethanol into a He atmosphere gas and using a high frequency electric source of 10 MHz or more as an electric source. The above high frequency is applied to the above mixed gas to produce a plasma and the magnetic head slider is placed therein for about one minute to be subjected to surface treatment, whereby a part of the methanol or ethanol is decomposed and the introduction of many hydroxyl groups onto the surface is made possible as shown in FIGS. 12D and 12C.

Figure 12E:
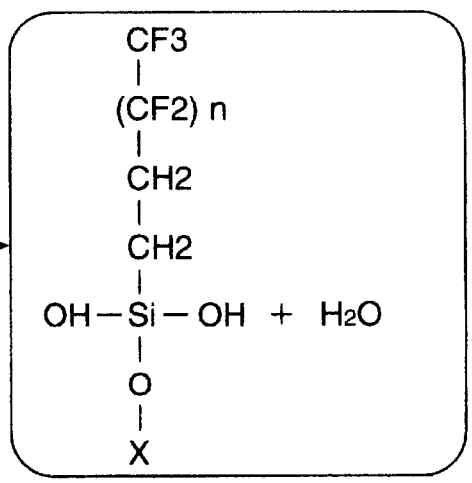
Figure 12D:
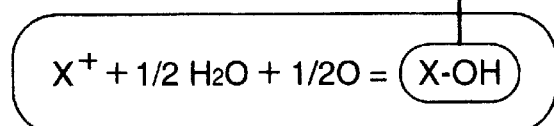

The slider subjected to the surface treatment is immersed in the above-mentioned solvent and then taken out by dipping, after which it is heated to about 150° C., upon which dehydration reaction is caused as shown in FIG. 12E to form an alkoxy group.

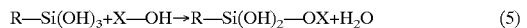

wherein X is the element of the surface material and R—$Si(OH)_2$—OX is an alkylsilane compound.

In the above reaction, many activated oxygen and hydroxyl groups exist on the surface, so that many fluoroalkoxyl groups are adsorbed and a dense layer having many adsorbing sites can be formed. Furthermore, between the adjacent molecules, a siloxane bond represented by Si—O—Si can be produced and cross-linking proceeds, so that a strong layer can be formed.

In order to confirm the oil repellency of this layer, 0.05 ml of a fluorine type lubricant liquid was dropped onto the treated surface and the contact angle was determined. The results obtained are shown in FIG. 13. Three kinds of a slider in the non-treated state, a slider subjected directly to oil repellent treatment and a slider subjected to plasma pretreatment and then to oil repellent treatment were subjected to measurement and the results obtained were compared. The non-treated slider had a contact angle as low as about 12° on average, while the slider subjected to oil repellent treatment had a contact angle of 24° on average. Moreover, it was confirmed that the slider subjected to plasma treatment as the pretreatment, which is of this invention, showed a contact angle of about 40° on average. Even in this case, since the activation treatment such as plasma pretreatment had been conducted, the same effect as in the case of a contact angle of 50° or more was obtained.

Figure 14:
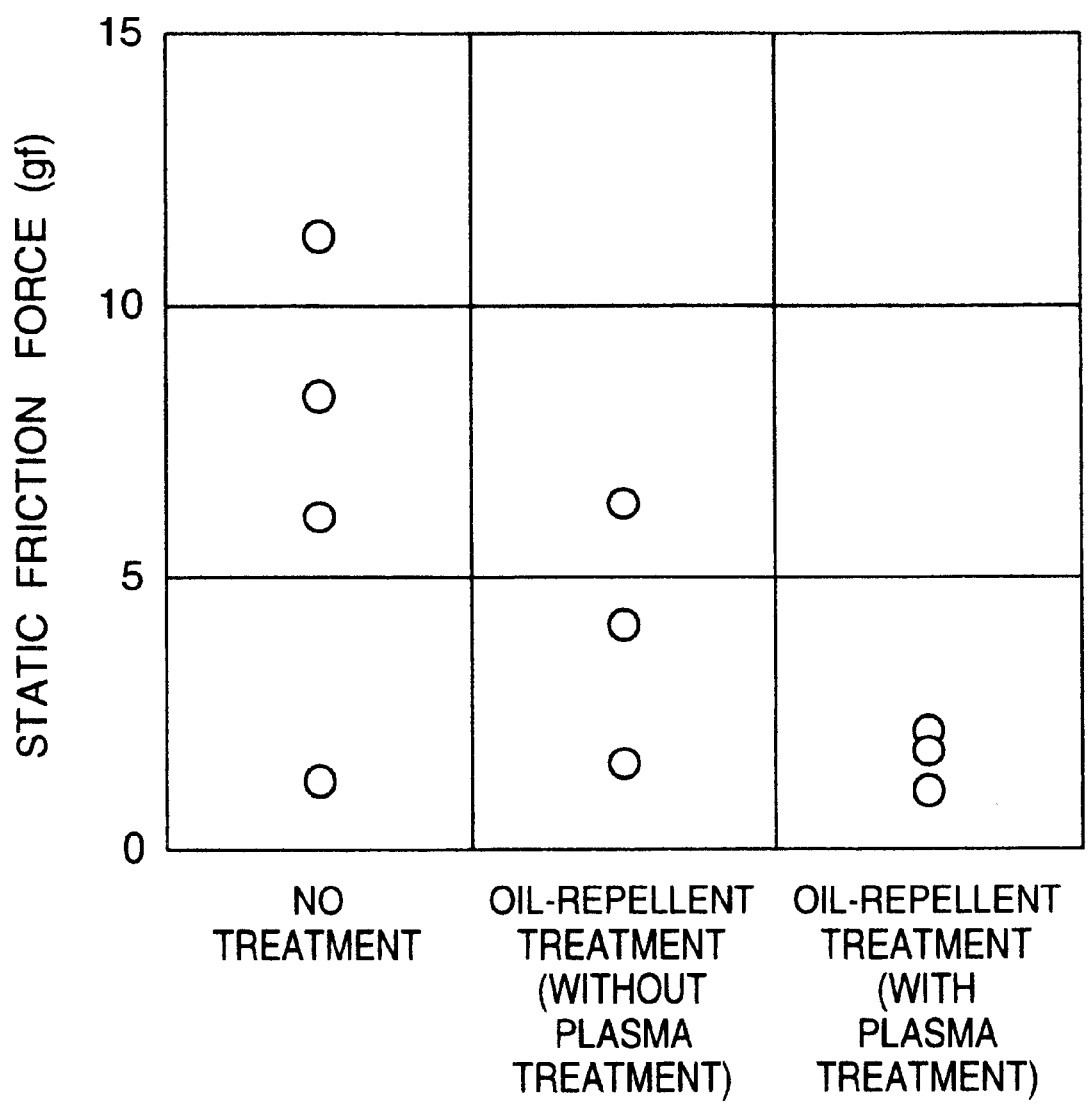
FIG. 14 is a view showing the result of a test of the static friction force of the magnetic head slider in the Example shown in FIG. 10 in comparison with a conventional example.

In order to confirm whether or not this performance is exerted in a disk which is practically used, a practical magnetic hard disk drive was driven for the given period of time and then stopped for 24 hours under the conditions of a temperature of 30° C. and a relative humidity of 60%, and thereafter, the static friction force for starting the drive was determined. The magnetic disk medium used had a carbon layer having a center line average height Ra of 5 nm or more coated with a fluorine type lubricant in a thickness of 1.5 nm. The pressing load of the suspension was 3 gf. The results are shown in FIG. 14. The friction force of the non-treated slider was largely varied from 2 to 12 gf and the average value thereof was as high as 8 gf. On the other hand, the friction force of the slider subjected to oil repellent treatment without plasma treatment was 2 to 6 gf and the average value thereof was as low as 4 gf. Subsequently, a sample which is the Example of this invention in which the plasma pretreatment was introduced was prepared. According to this Example, the friction force of the slider was as very low as 1.5 to 2.5 gf and could be lowered to about 2 gf on average, so that it was shown to have a great effect on the reduction of adhesion force.

EXAMPLE 4

Another method of the surface-treatment of a magnetic head slider is explained below. First of all, a carbon thin layer was formed in a thickness of about 10 nm on the zirconia slider body under such conditions that hydrogen was mixed into a nitrogen gas during the film formation by sputtering. This carbon thin layer was pretreated by ion implantation. The implantation conditions were such that an oxygen gas was accelerated at an acceleration voltage of 10 KV and the treatment was conducted for 30 seconds. The amount of ion implanted was $2 \times 10^{16}$ ions/cm$^2$, and corresponded to an oxygen/carbon concentration ratio of approximately 3%. This oxygen/carbon concentration ratio is desirably adjusted to 3 to 20%, and when it exceeds 20%, there is a fear of the material becoming porous and weak.

Figure 15:
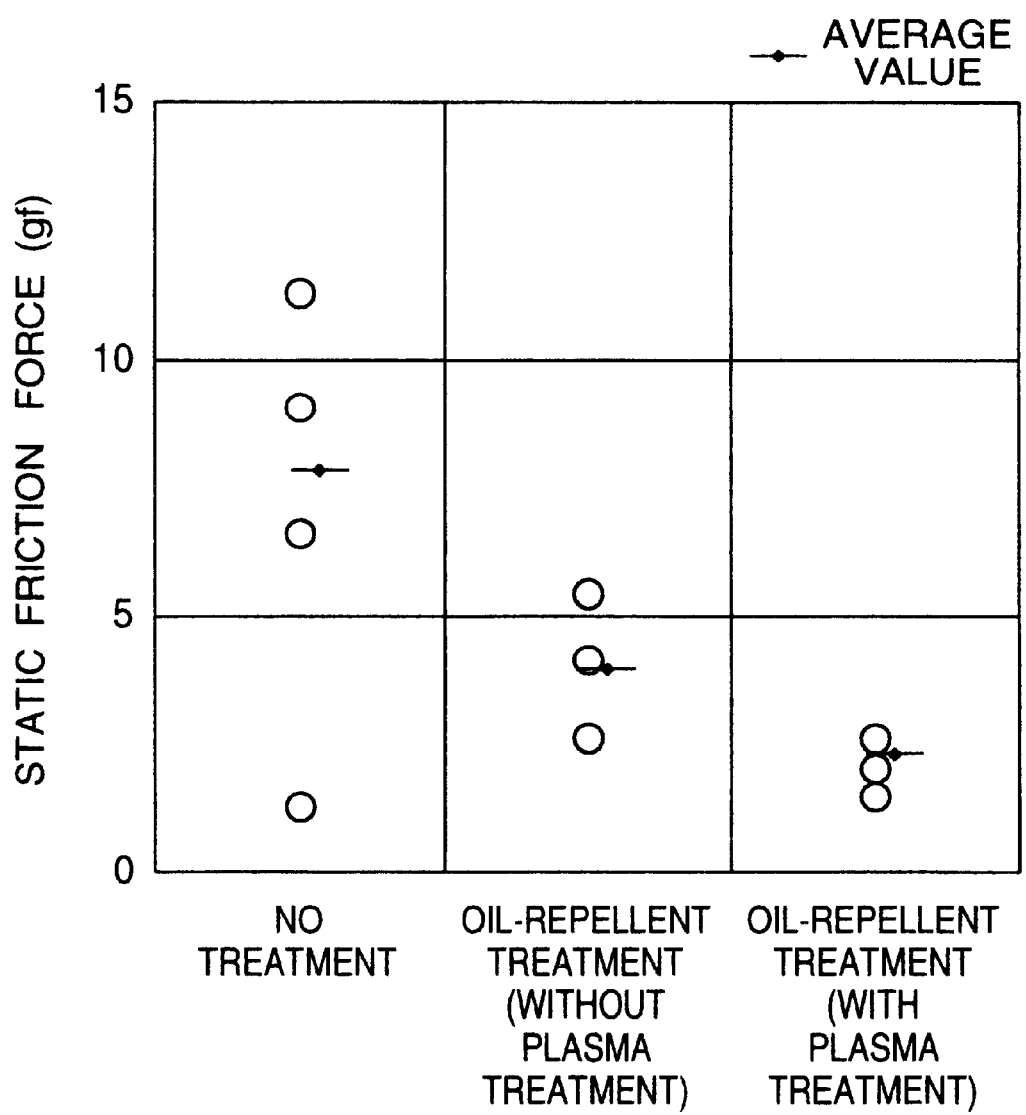
FIG. 15 is a view showing the result of a test of the static friction force of the magnetic head slider in Example 4 relating to this invention in comparison with a conventional example.

After the above pretreatment, a fluoroalkylalkoxysilane liquid was placed in a sealed vessel and heated to about 100° C. to be vaporized and allowed to adhere to the surface of a slider set thereabove. As a result, the reactions represented by the formulas (4) and (5) in Example 3 proceeded simultaneously, whereby it was possible to form an oil repellent layer in which the alkoxyl groups were firmly adhered to the slider surface. As to this performance, the results of measurement of the static friction force at the time of starting are shown in FIG. 15. The friction force of the non-treated slider was as high as 8 gf on average, while the friction force of the slider subjected to oil repellent treatment was 4 gf, and in the case of a sample subjected to ion implantation treatment which is the present Example became as very low as about 2.5 gf on average, and it was confirmed to have a great effect on the reduction of adhesion force. Incidentally, as to the acceleration voltage, substantially the same effect was confirmed even when it was in the range of 2 to 30 KV. In the present Example, a layer having a high oil repellent effect can be formed and, in addition, the hardness of the protective layer per se becomes high and an effect of reducing the abrasion is also seen.

EXAMPLE 5

Figure 16:
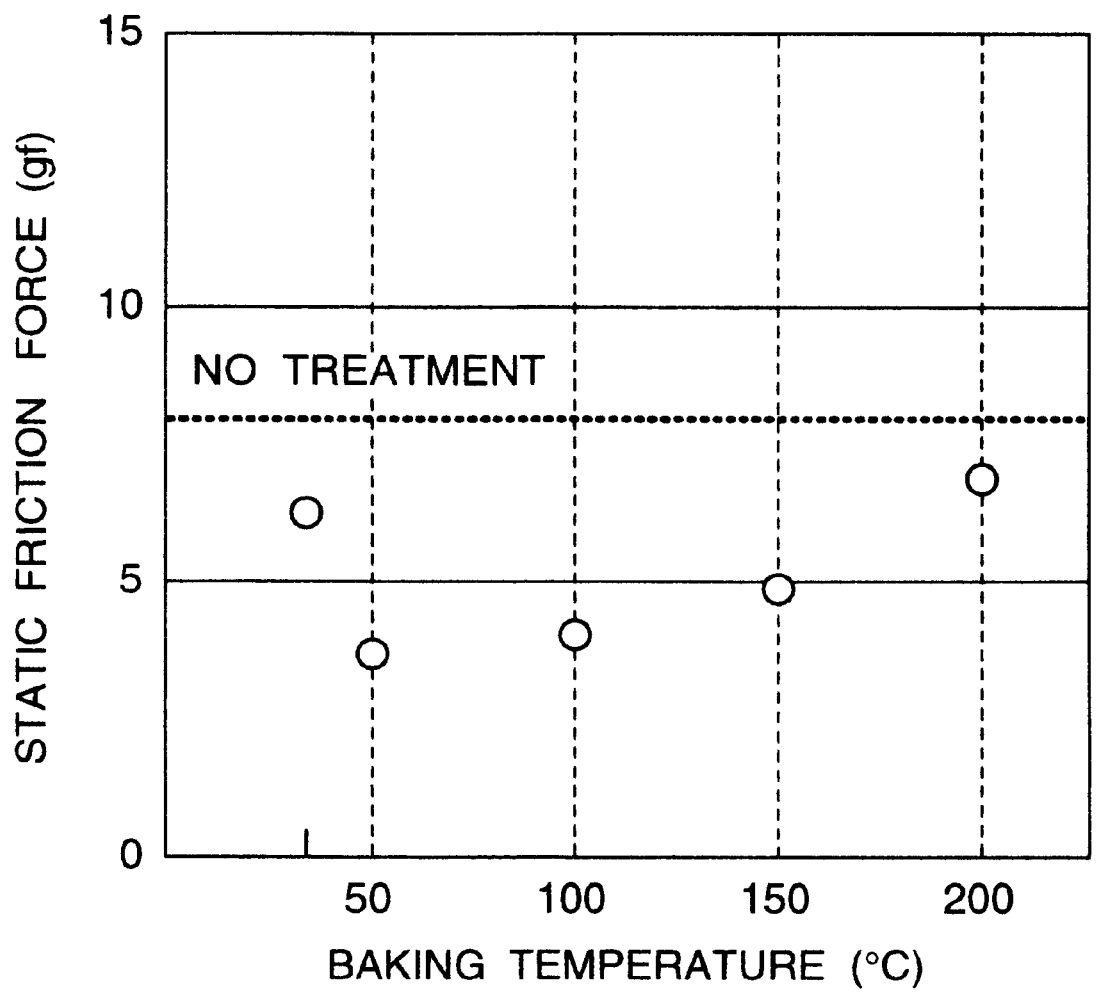
FIG. 16 is a view showing the result of a test of the static friction force of the magnetic head slider in Example 5 relating to this invention in comparison with a conventional example.

Still another method of the surface treatment of a magnetic head slider is explained below. This slider 23 was composed of a slider body of alumina titanium carbide and a carbon thin layer formed thereon in a thickness of 8 nm by sputtering under the conditions that nitrogen was mixed. This slider was immersed in a fluorosilane solution and the latter was attached to the former by dipping. Subsequently, it was irradiated with an ultraviolet light using a low pressure mercury vapor lamp in an ozone atmosphere. The ultraviolet light irradiation was conducted at an intensity of 50 mW/cm$^2$ for 10 minutes. Thereafter, using temperature as a parameter, baking treatment was conducted at a temperature between 30° C. and 250° C. for about 20 minutes. As to the stiction resistance performance of the slider subjected to this treatment, the results obtained by measuring friction force at the time of the starting are shown in FIG. 16. The friction force of the non-treated slider was as high as 8 gf, while the slider subjected to the ultraviolet light treatment was generally low in friction force, and it was found to have a dependency on the subsequent baking temperature. At 30° C., the friction force was 6 gf and hence its reduction effect was small, while at 50° C., it was lowered to 4 gf or less and the said tendency was not so varied though when the baking temperature was elevated some elevation of the friction force was seen. However, when it exceeded 200° C., the lowering of the friction force was inversely seen. The reason therefor was not clear, but it is considered to result from the change of the molecular structure or the deterioration of the strength of the undercoat. According to the experiment of the present inventors, it is desirable to adjust the baking temperature in the range of 50 to 150° C.

In the present Example, in addition to the effect of rendering the surface oil repellent, there are such an effect that adhered contaminants such as organic materials and the like can be decomposed by irradiation with an ultraviolet light and an effect of the surface-cleaning action.

Figure 17:
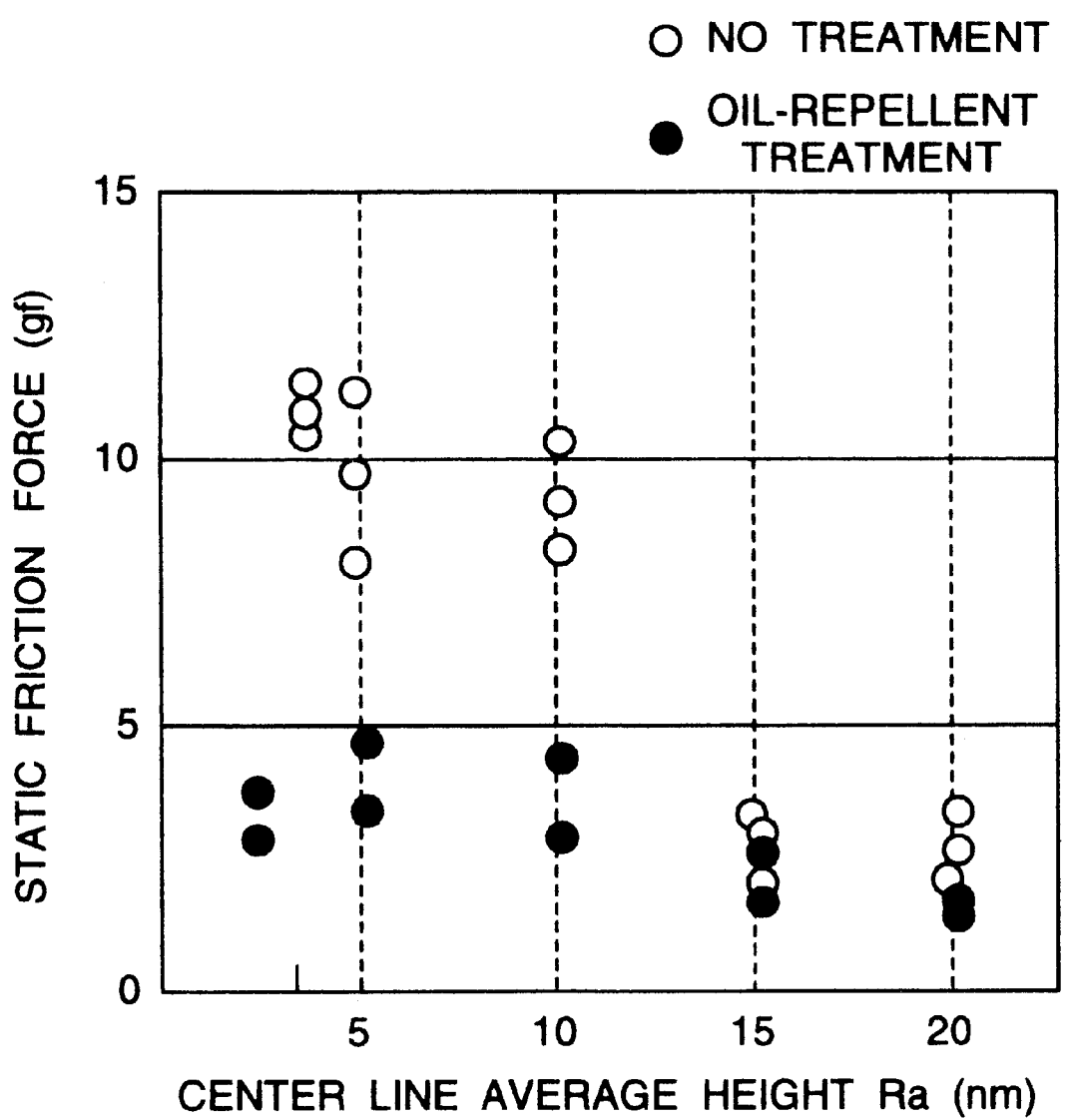
FIG. 17 is a graph showing the center line average height dependency of a magnetic disk in relation to static friction force when the magnetic head slider subjected to oil repellent treatment of this invention is used.

Moreover, since the adsorption force depends greatly on the center line average height Ra of the magnetic disk medium, a test was made for clarifying this influence. In Example 5, a test was conducted using a slider whose baking temperature was 150° C. and using a magnetic disk medium having a center line average height Ra of 2, 5, 10, 15 or 20 nm. The results obtained are shown in FIG. 17. When the center line average height was 15 nm or more, it was confirmed that even a sample which had not been subjected to the oil repellent treatment had a friction force as low as 3 gf or less and the treatment per se was not necessary. However, in the case of a magnetic disk medium having Ra of 10 nm or less, it was confirmed that the friction force of the non-treated slider was as large as 8 gf or more, while the above oil repellent treatment resulted in a reduction of the friction force to 5 gf or less, and hence, the effect of the oil repellent treatment was large.

EXAMPLE 6

The same procedure as in Example 5 was repeated, except that the irradiation with an ultraviolet light was conducted after the formation of a carbon thin layer and before the immersion in a fluorosilane solution.

As a result, the bonding of the fluoroalkylsilane to the carbon thin layer could be made stronger than in Example 5.

As described above, by subjecting the magnetic head slider surface to plasma treatment or the like, it is possible to strongly adhere a fluoroalkylsilane compound having a silane group to the slider surface, and consequently the surface has a high oil repellency and a magnetic head slider which does not cause adsorption to the magnetic disk can be realized. Moreover, it has also such an effect that the adhesion to the slider surface of not only the lubricant on the magnetic disk but also foreign matter which becomes a contamination can be reduced.

What is claimed is:

1. A magnetic hard disk drive comprising:

a magnetic disk for recording signals; and a magnetic head slider having a slider surface facing the magnetic disk and including a magnetic head element for recording and reproducing information by scanning on the revolving magnetic disk, a one lauer structure made of a fluorine-containing silane compound chemically bonded, by a terminal group of the fluorine-containing silane compound, to said slider surface, wherein the fluorine-containing silane compound is a fluoro-alkylsilane monomer of the formula:

$$F_3C\text{—}(CF_2)n\text{—}(CH_2)m\text{—}SiX_3 \tag{2}$$

wherein X is an alkoxy group having 1 to 6 carbon atoms, a halogen or a cyano group; n is an integer of 0 to 13; and m is an integer of 0 to 10.

2. A magnetic head slider having a slider surface comprising a magnetic head element for recording and reproducing information by scanning on a revolving magnetic disk, and a one layer structure made of a fluorine-containing silane compound chemically bonded, by a terminal group of the fluorine-containing silane compound, to said slider surface, wherein the fluorine-containing silane compound is a fluoro-alkylsilane monomer of the formula:

$$F_3C\text{—}(CF_2)n\text{—}(CH_2)m\text{—}SiX_3 \tag{2}$$

wherein X is an alkoxy group having 1 to 6 carbon atoms, a halogen or a cyano group; n is an integer of 0 to 13; and m is an integer of 0 to 10.

* * * * *

UNITED STATES PATENT AND TRADEMARK OFFICE
CERTIFICATE OF CORRECTION

PATENT NO.   : 6,249,403 B1
DATED        : June 19, 2001
INVENTOR(S)  : Hiromitsu Tokisue et al.

It is certified that error appears in the above-identified patent and that said Letters Patent is hereby corrected as shown below:

Title page,
Change the filing date of the second listed foreign priority application from "May 23, 1997" to -- June 23, 1997 --.

Column 12,
Line 42, change "lauer" to -- layer --.

Signed and Sealed this

Twenty-third Day of April, 2002

Attest:

JAMES E. ROGAN
Attesting Officer       Director of the United States Patent and Trademark Office